(12) United States Patent
Kobayashi et al.

(10) Patent No.: US 7,372,684 B2
(45) Date of Patent: May 13, 2008

(54) POWER SUPPLY DEVICE

(75) Inventors: Tokio Kobayashi, Kanagawa (JP); Toshiya Nakabayashi, Tokyo (JP)

(73) Assignee: Sony Corporation (JP)

( * ) Notice: Subject to any disclaimer, the term of this patent is extended or adjusted under 35 U.S.C. 154(b) by 178 days.

(21) Appl. No.: 11/134,334

(22) Filed: May 23, 2005

(65) Prior Publication Data

US 2006/0012249 A1    Jan. 19, 2006

(30) Foreign Application Priority Data

May 31, 2004    (JP)    ............................ P2004-162038

(51) Int. Cl.
*H02H 3/24*    (2006.01)
(52) U.S. Cl. ......................................... 361/92; 361/18
(58) Field of Classification Search .................. 361/18, 361/96, 115, 86, 92, 94, 95, 97; 323/282, 323/284; 363/56.04
See application file for complete search history.

(56) References Cited

U.S. PATENT DOCUMENTS

| | | | | |
|---|---|---|---|---|
| 3,665,253 | A * | 5/1972 | Stefani | 361/74 |
| 3,679,964 | A * | 7/1972 | Nowell | 361/18 |
| 4,045,887 | A * | 9/1977 | Nowell | 361/98 |
| 5,565,761 | A * | 10/1996 | Hwang | 323/222 |
| 5,596,465 | A | 1/1997 | Honda et al. | |
| 5,796,596 | A * | 8/1998 | Williams | 363/21.16 |
| 6,201,674 | B1 * | 3/2001 | Warita et al. | 361/18 |
| 6,456,051 | B2 * | 9/2002 | Darzy | 323/284 |
| 6,967,851 | B2 * | 11/2005 | Yang et al. | 363/16 |
| 7,068,485 | B2 * | 6/2006 | Ishikawa et al. | 361/93.9 |
| 2003/0141856 | A1 | 7/2003 | Kimura | |
| 2003/0202297 | A1 | 10/2003 | Ding et al | |
| 2004/0032754 | A1 | 2/2004 | Yang | |

FOREIGN PATENT DOCUMENTS

| | | |
|---|---|---|
| JP | 63-077375 | 4/1988 |
| JP | 01-295671 | 11/1989 |

(Continued)

OTHER PUBLICATIONS

EPO Search Report mailed Sep. 30, 2005.

(Continued)

*Primary Examiner*—Michael Sherry
*Assistant Examiner*—Christopher J Clark
(74) *Attorney, Agent, or Firm*—Rader Fishman & Grauer PLLC; Ronald P. Kananen

(57) ABSTRACT

A power supply device has a pulse width control circuit for controlling voltage converting operation of a voltage converting circuit by changing a pulse width. A momentary interruption detecting circuit detects a change in an output voltage when the output voltage suffers a momentary interruption over a short period of time. A full short-circuit detecting circuit detects a change in the output voltage when the output voltage suffers a short circuit over a very short period of time. A short-circuit control circuit stops a pulse width changing control process of the pulse width control circuit a predetermined period of time after the momentary interruption detecting circuit has detected that the output voltage suffers a momentary interruption, and stops the pulse width changing control process of the pulse width control circuit immediately when the full short-circuit detecting circuit detects that the output voltage suffers a short circuit.

9 Claims, 3 Drawing Sheets

FOREIGN PATENT DOCUMENTS

| | | |
|---|---|---|
| JP | 09-322390 | 12/1997 |
| JP | 11-136846 | 5/1999 |
| JP | 11-164548 | 6/1999 |
| JP | 2000-115998 | 4/2000 |
| JP | 2001-025165 | 1/2001 |
| JP | 2001-160747 | 6/2001 |
| JP | 2003-281968 | 10/2003 |

OTHER PUBLICATIONS

Japanese Office Action; Application No. 2004-162038; Dated: Feb. 20, 2007.

* cited by examiner

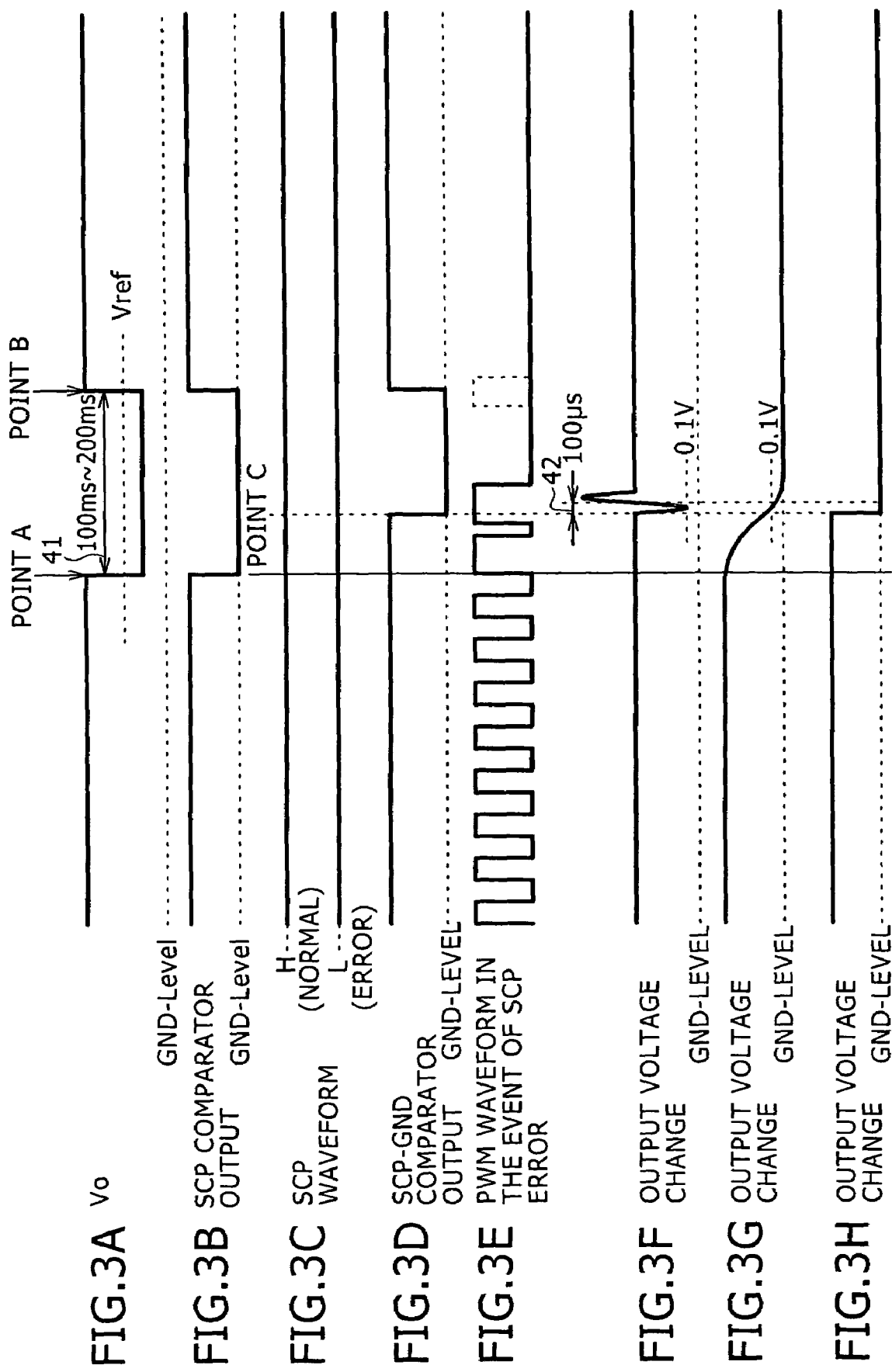

POWER SUPPLY DEVICE

BACKGROUND OF THE INVENTION

The present invention relates to a power supply device for regulating and supplying a voltage generated by a DC power supply to an outer circuit. The power supply device has a capability for controlling an output voltage to prevent circuit components from being damaged upon occurrence of a momentary output voltage interruption or short circuit.

In recent years, fast-paced efforts have been made for developing small-size, lightweight, and low-power-consumption electronic devices such as magnetic recording and reproducing devices with combined cameras. For lower power consumption, a switching power supply is indispensable to such electronic devices. It is primarily customary for the switching power supply to use transistors in performing its switching operation.

Electronic devices having dry batteries such as nickel-cadmium (NiCd) cells or nickel-hydrogen (NiH) cells as a power source are generally widely used in the art. Since these dry batteries have output voltages in a relatively low range, the voltages that can be supplied from these cells may not match voltages that are used in electronic devices. Therefore, a voltage converting device called a DC/DC converter is used to convert the output voltage of a dry battery for stably supplying a necessary power supply voltage to a desired electronic circuit.

If an abrupt large current flows from a switching power supply due to a short circuit in the load connected to the output stage of the switching power supply, then the fuse of an electronic device incorporating the switching power supply may possibly melt, or transistors or other components of the electronic device may be broken. According to one approach to solving this problem, a short-circuit detecting comparator is incorporated in the IC (Integrated Circuit) of a switching power supply. When the output voltage of the switching power supply exceeds a certain preset voltage, a timer latch circuit is activated. The output voltage of the switching power supply is cut off if it remains continuously in excess of the preset voltage for a period of time set by the timer latch circuit.

Some conventional DC/DC converters have a switching element in the form of a bipolar transistor The amount of current that flows in a DC/DC converter is limited by the base current of a bipolar transistor. Consequently, it is uncommon for the fuse of an electronic circuit incorporating a DC/DC converter to melt while the timer latch is monitoring the output voltage for a period of time set thereby.

Recently available DC/DC converters employ a switching element in the form of an N-channel MOS-FET (Metal Oxide Semiconductor-Field Effect Transistor), which is selectively turned on and off depending a switching pulse applied thereto.

A conventional boosting DC/DC converter power supply device will be described below. When an input voltage is applied from a dry battery, a voltage converting circuit converts the input voltage into an output voltage Vo, which is supplied to a load circuit. A PWM (Pulse Width Modulation) control circuit generates a PWM signal for turning on and off a switching transistor of the voltage converting circuit. The output current from the switching transistor is rectified to produce the output voltage Vo.

The voltage converting circuit will be described below. In the voltage converting circuit, an FET has a drain connected to a power supply terminal through a choke coil and a source connected to ground. The FET has a gate connected to a pulse input terminal for being supplied with a switching pulse from the PWM control circuit.

The junction between the FET and the choke coil is connected to the anode of a diode (Schottky diode). A capacitor has a terminal connected to the cathode of the diode and another terminal connected to ground.

When the FET is switched off by the switching pulse, a voltage higher than the voltage at the power supply terminal is produced at the junction between the choke coil and the diode due to the excited energy discharged from the choke coil, charging the capacitor. The voltage at the junction gradually drops and reaches a level substantially equal to the ground voltage when the FET is turned on again. Therefore, a voltage change in response to the switching pulse appears at the anode of the diode. The voltage change is rectified by the diode into a voltage higher than the input voltage. The rectified voltage is smoothed by the capacitor, and the smoothed voltage is supplied from an output terminal to the load.

Japanese Patent Laid-open No. Hei 11-164548 discloses a power supply device for preventing an overcurrent from flowing through a switching element when an input AC voltage abruptly increases. According to the disclosed power supply device, when the input AC voltage is momentarily interrupted, a comparator does not generate a pulse because it is not supplied with a voltage from a rectifying circuit during the momentary interruption of the input AC voltage. At this time, a pulse detecting circuit cannot detect a pulse and outputs a breaking signal. Since the pulse detecting circuit outputs the breaking signal with a delay of about 20 msec., it continuously outputs the breaking signal for about 20 msec. even after the momentary interruption of the input AC voltage is recovered. When a drive pulse generating circuit receives the breaking signal from the pulse detecting circuit, it stops generating a drive pulse, turning off the switching element.

Japanese Patent Laid-open No. Sho 63-77375 reveals a starter circuit for a DC/DC converter, the starting circuit being capable of preventing an output voltage of the DC/DC converter from abruptly rising due to a main power supply interruption. When a voltage supplied from the main power supply to the primary side of the DC/DC converter exceeds a reference voltage, a soft starter circuit for the DC/DC converter is energized again.

The applicant of the present application has applied for a patent on a power supply device as disclosed in Japanese Patent Application No. 2003-281968. According to the disclosed power supply device, even when a voltage supplied from a dry battery is temporarily interrupted, an upper limit (MAX-Duty) for a PWM signal is forcibly lowered to prevent an excessive voltage from being applied to the load, thereby preventing a device connected to the load from being broken and also preventing a PWM control IC to which the output voltage is applied as a feedback signal from being broken.

When a short circuit occurs in the circuit employing the FET of the above DC/DC converter, since the short circuit occurs with the on resistance (several hundred milliohms) of the FET, a large current flows at the instant of the short circuit. Therefore, before the short-circuit detecting mechanism of the IC operates, the fuse may melt, or the FET may be destroyed.

The above problem arises in the event of a short circuit occurring in certain adverse user environments such as moisture condensation. Even through the problem can be solved by improving such adverse user environments, once the fuse melts, the power supply device needs to be taken care of by the manufacturer's repair services.

The power supply device disclosed in Japanese Patent Laid-open No. Hei 11-164548 turns off the switching element in the event of an input AC voltage interruption. The starter circuit disclosed in Japanese Patent Laid-open No. Sho 63-77375 detects that the input voltage applied to the primary side of the DC/DC converter exceeds a prescribed level and energizes again the soft starter circuit for the DC/DC converter.

A power supply device according to the present invention is not arranged to stop the output only when the input voltage is interrupted as disclosed in Japanese Patent Laid-open No. Hei 11-164548, but detects a short circuit in various output voltage patterns and stops a PWM signal. The power supply device according to the present invention does not energize a soft starter circuit again unlike the starter circuit disclosed in Japanese Patent Laid-open No. Sho 63-77375.

SUMMARY OF THE INVENTION

It is an object of the present invention to provide a power supply device for preventing an excessive voltage to be applied to a load by forcibly stopping a PWM signal even upon occurrence of a momentary output voltage interruption or short circuit, thereby preventing a device connected to the load from being broken, and also for preventing an FET of a DC/DC converter for generating the output voltage from being broken.

According to the present invention, a power supply device includes a pulse width control unit for controlling voltage converting operation of a voltage converting unit by changing a pulse width, a momentary interruption detecting unit for detecting a change in a secondary output DC voltage when the secondary output DC voltage suffers a momentary interruption over a short period of time, a full short-circuit detecting unit for detecting a change in the secondary output DC voltage when the secondary output DC voltage suffers a short circuit over a very short period of time, and a short-circuit control unit for stopping a pulse width changing control process of the pulse width control unit a predetermined period of time after the momentary interruption detecting unit has detected when the secondary DC output voltage suffers a momentary interruption, and for stopping the pulse width changing control process of the pulse width control unit immediately when the full short-circuit detecting unit detects that the secondary DC output voltage suffers a short circuit.

With the above arrangement, the pulse width control unit controls the voltage converting operation of the voltage converting unit by changing a pulse width. The momentary interruption detecting unit detects a change in the secondary output DC voltage when the secondary output DC voltage suffers a momentary interruption over a short period of time. The full short-circuit detecting unit detects a change in the secondary output DC voltage when the secondary output DC voltage suffers a short circuit over a very short period of time. The short-circuit control unit stops the pulse width changing control process of the pulse width control unit a predetermined period of time after the momentary interruption detecting unit has detected that the secondary DC output voltage suffers a momentary interruption, and stops the pulse width changing control process of the pulse width control unit immediately when the full short-circuit detecting unit detects that the secondary DC output voltage suffers a short circuit.

Even when the output voltage suffers a momentary interruption or a short circuit, the power supply device forcibly stops a PWM signal to prevent an excessive voltage from being applied to a load thereby to prevent a device connected to the load from being broken, and also to prevent an FET of a DC/DC converter for generating the output voltage from being destroyed. The power supply device is capable of cutting off the output voltage in the event of a full short circuit due to various waveforms based on various phenomena, thus preventing a physical failure such as a fuse melting or a component breakdown. When the output voltage slowly drops such as when the output voltage is momentarily interrupted over a short period of time, the power supply device performs a normal protecting process, and does not detect a short circuit in error and avoids an undue output voltage cut-off.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3A to 3H are timing charts of operation of the power supply device, 3A showing an input voltage, 3B an SCP comparator output signal, 3C an SCP waveform, 3D an SCP-GND comparator output signal, 3E a PWM waveform in the event of an SCP error, 3F a bottom-peak output voltage change, 3G a slow-fall output voltage change, and 3H a sharp-fall output voltage change.

DESCRIPTION OF THE PREFERRED EMBODIMENT

Figure 1:
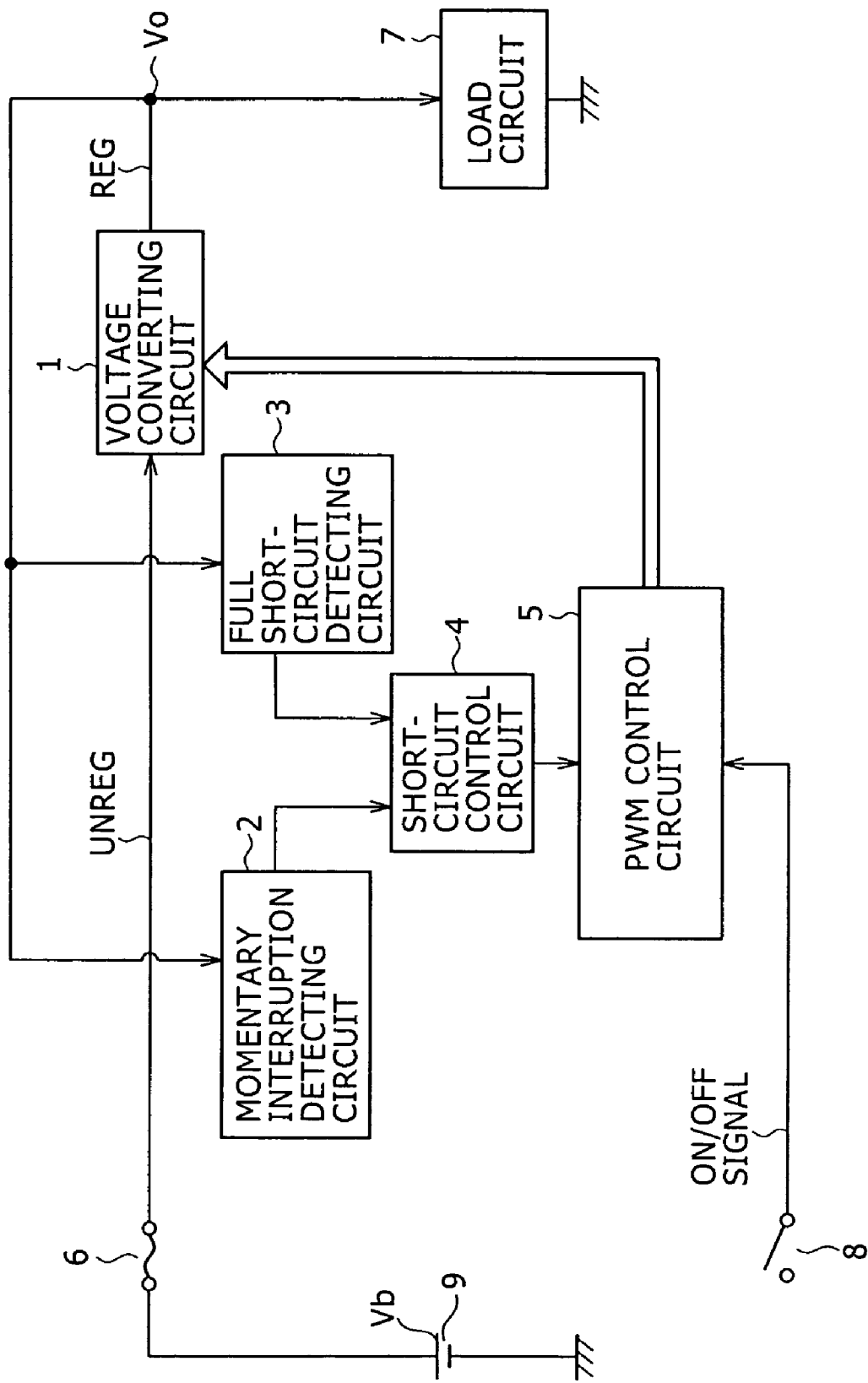
FIG. 1 is a block diagram of a power supply device according to the present invention.

FIG. 1 shows in block form a power supply device according to the present invention.

As shown in FIG. 1, the power supply device includes a DC power supply Vb as a power supply source in the form of a dry battery 9, a fuse 6 for protecting the DC power supply Vb, a voltage converting circuit 1 for converting a voltage (UNREG) from the DC power supply Vb into a desired output voltage Vo (REG) to be supplied to a load circuit 7, a PWM control circuit 5 for amplifying a change in the voltage Vo output from the voltage converting circuit 1 with an on/off signal from a power supply switch 8 to generate a PWM signal for controlling the converting operation of the voltage converting circuit 1 by changing the pulse width of the PWM signal, a momentary interruption detecting circuit 2 for detecting a change in the output voltage Vo when the output voltage Vo suffers a momentary interruption over a short period of time, a full short-circuit detecting circuit 3 for detecting a change in the output voltage Vo when the output voltage Vo suffers a short circuit over a very short period of time, and a short-circuit control circuit 4 for stopping the pulse width changing control process of the PWM control circuit 5 a predetermined period of time after the momentary interruption detecting circuit 2 has detected that the output voltage Vo suffers a momentary interruption, and for stopping the pulse width changing control process of the PWM control circuit 5 immediately when the full short-circuit detecting circuit 3 detects that the output voltage Vo suffers a short circuit.

The PWM control circuit 5 controls the converting operation of the voltage converting circuit 1 by changing the pulse width of the PWM signal. The momentary interruption detecting circuit 2 detects a change in the output voltage Vo when the output voltage Vo suffers a momentary interruption over a short period of time. The full short-circuit detecting circuit 3 detects a change in the output voltage Vo when the output voltage Vo suffers a short circuit over a very short period of time. The short-circuit control circuit 4 stops the pulse width changing control process of the PWM control circuit 5 a predetermined period of time after the momentary interruption detecting circuit 2 has detected when the output voltage Vo suffers a momentary interruption, and stops the pulse width changing control process of the PWM control circuit 5 immediately when the full short-circuit detecting circuit 3 detects when the output voltage Vo suffers a short circuit.

Figure 2:
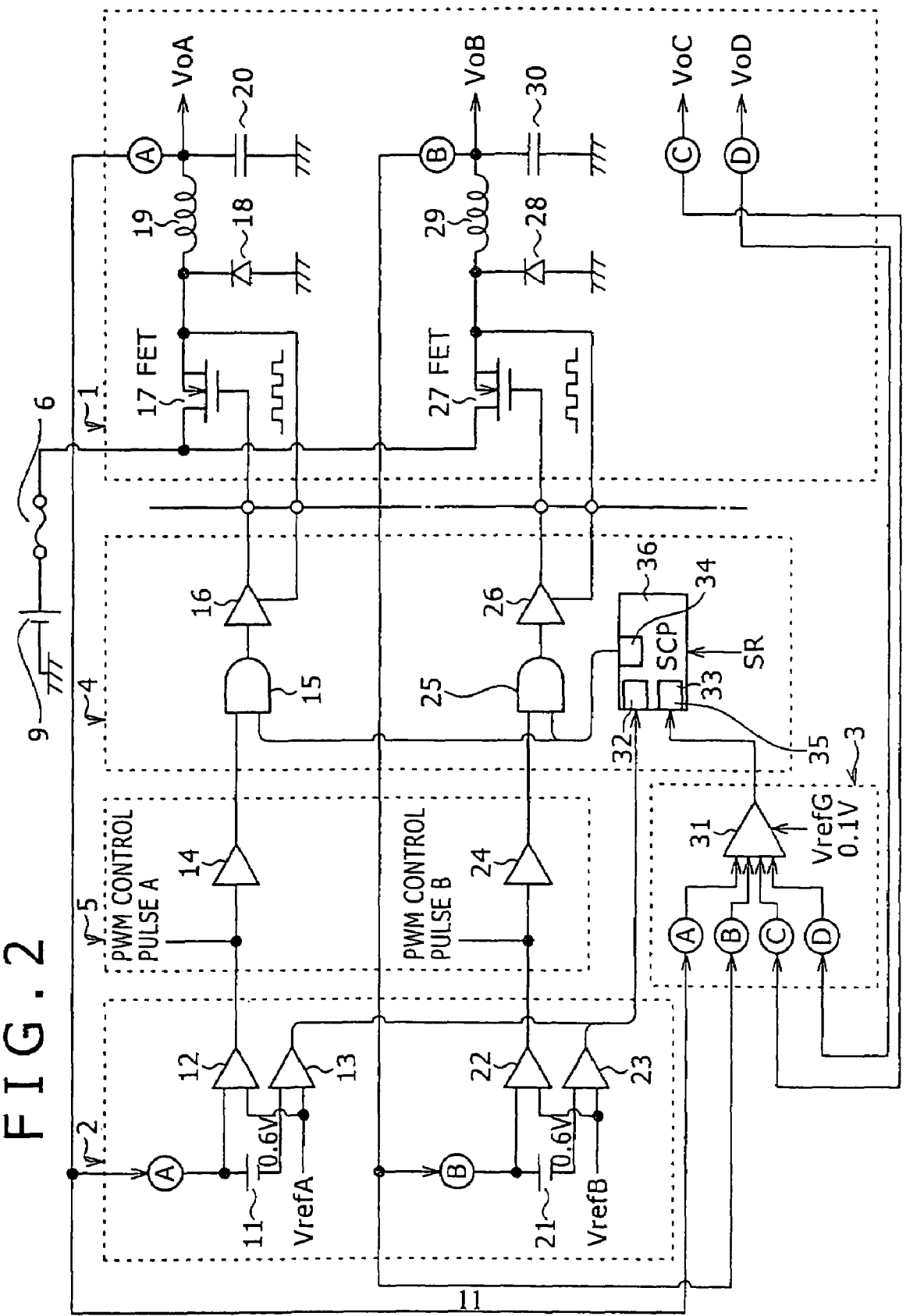
FIG. 2 is a circuit diagram, partly in block form, of the power supply device, showing the manner in which a full short-circuit detecting circuit and a short-circuit control circuit operate.

FIG. 2 shows the manner in which the full short-circuit detecting circuit 3 and the short-circuit control circuit 4 operate. In FIG. 2, the momentary interruption detecting circuit 2, the full short-circuit detecting circuit 3, the short-circuit control circuit 4, and the PWM control circuit 5, which are shown on the left-hand side of a vertical dot-and-dash line, are provided in a DC/DC converter IC, and the voltage converting circuit 1, which is shown on the right-hand side of the vertical dot-and-dash line, is provided as an external circuit added to the DC/DC converter IC.

The voltage converting circuit 1 as an external circuit is similar to the conventional DC/DC converter power supply device described above. Operation of the voltage converting circuit 1 will briefly be described below. When FETs 17, 27 are turned on and off by PWM signals from the PWM control circuit 5, the FETs 17, 27 convert an input voltage from the dry battery 9 into rectangular waves, which are integrated and rectified to produce output voltages VoA, VoB by Schottky diodes 18, 28, choke coils 19, 29, and smoothing capacitors 20, 30. The output voltages VoA, VoB, VoC, VoD, . . . are of different values such as 2.6 V, 5 V, 10 V, 12 V, . . . to be supplied to loads in different channels.

Details of the momentary interruption detecting circuit 2 will be described below with reference to FIG. 2.

When the output voltages VoA, VoB having desired levels cannot be supplied to the load due to a certain difficulty on the loads that are connected to the output stage of the power supply device, SCP (Short Current Protect) comparators 13, 23 of the momentary interruption detecting circuit 2 in the DC/DC converter IC detect such a condition by comparing the output voltages VoA, VoB with respective reference voltages VrefA, VrefB. The SCP comparators 13, 23 supply detected signals to an SCP circuit 36 of the short-circuit control circuit 4.

In the SCP circuit 36, an internal timer latch circuit 32 starts measuring times of 100 ms and 200 ms set in the respective channels in response to the detected signals from the SCP comparators 13, 23. When the times of 100 ms and 200 ms elapse, an output controller 34 of the SCP circuit 36 supplies an error low-level signal L to AND gates 15, 25. The AND gates 15, 25 then output low-level signals L to operational amplifiers 16, 26 irrespective of PWM signals from the PWM control circuit 5. Since PWM signals are not supplied from the PWM control circuit 5 through the short-circuit control circuit 4 to the voltage converting circuit 1, the supply of the output voltages VoA, VoB from the voltage converting circuit 1 to the loads is cut off. Though the output signals from the SCP comparators 13, 23 are illustrated as being of active low logic, they may be of active high logic.

Normally, the output controller 34 of the SCP circuit 36 supplies a high-level signal H to the AND gates 15, 25 to supply PWM signals from the PWM control circuit 5 to the operational amplifiers 16, 26.

The SCP comparators 13, 23 are provided in the respective channels for the output voltages VoA, VoB for the following reasons: The abilities to supply the output voltages VoA, VoB are set to different settings, so that under different loads in the respective channels, they prevent a circuit breaking action due to a detection error which would be caused by identical settings in all the channels in a situation where the output voltages VoA, VoB to be detected for a short circuit, drop in level due to a momentary load increase.

Details of the full short-circuit detecting circuit 3 will be described below with reference to FIG. 2.

Even while a momentary interruption of the output voltages VoA, VoB is being detected by the momentary interruption detecting circuit 2, when the output voltages VoA, VoB suffers a short circuit and drop to the ground level GND, a SCP-GND comparator 31 of the full short-circuit detecting circuit 3 detects such a condition by comparing the output voltages VoA, VoB with a reference voltage VrefG. The SCP-GND comparator 31 supplies a detected signal to the SCP circuit 36 of the short-circuit control circuit 4.

The power supply device also has circuit details for the output voltages VoC, VoD, . . . , which are identical to those of the momentary interruption detecting circuit 2, the full short-circuit detecting circuit 3, the short-circuit control circuit 4, the PWM control circuit 5, and the voltage converting circuit 1 for the voltages VoA, VoB. Those circuit details for the output voltages VoC, VoD, . . . will not be described below as they are identical to those shown in FIG. 2.

In the SCP circuit 36, an internal timer latch circuit 33 operates to immediately latch a low-level signal L supplied thereto from the SCP-GND comparator 31, as indicated by 35 in FIG. 2. Immediately thereafter, or actually after elapse of a time of 100 μs measured by the internal timer latch circuit 33, the output controller 34 of the SCP circuit 36 supplies an error-indicating low-level signal L to the AND gates 15, 25. The AND gates 15, 25 then output low-level signals L to the operational amplifiers 16, 26 irrespective of PWM signals from the PWM control circuit 5. Since PWM signals are not supplied from the PWM control circuit 5 through the short-circuit control circuit 4 to the voltage converting circuit 1, the supply of the output voltages VoA, VoB from the voltage converting circuit 1 to the loads is cut off. Though the output signal from the SCP-GND comparator 31 is illustrated as being of active low logic, they may be of active high logic.

As described above, when either one of the output voltages VoA, VoB, VoC, VoD, . . . abruptly changes, i.e., suffers a short circuit and drops to the ground level GND, the full short-circuit detecting circuit 3 operates to immediately cut off the output voltages in all the channels before the DC/DC converter IC and the external circuit are broken. Therefore, the single SCP-GND comparator 31 is shared by all the channels.

FIG. 3 is a timing chart of operation of the power supply device, 3A showing an output voltage, 3B an SCP comparator output signal, 3C an SCP waveform, 3D an SCP-GND comparator output signal, 3E a PWM waveform in the event of an SCP error, 3F a bottom-peak output voltage change, 3G a slow-fall output voltage change, and 3H a sharp-fall output voltage change.

When the output voltage Vo suffers a momentary interruption in a momentary interruption region 41 from a point A to a point B as shown in FIG. 3A, it is assumed that the output voltage Vo drops to a level below a predetermined reference voltage Vref (e.g., 0.6 V).

The SCP comparators 13, 23 shown in FIG. 2 detect the voltage drop, and output a pulse as shown in FIG. 3B. It is assumed that the SCP comparators 13, 23 normally produce an output signal at a high level H. Though the output signals from the SCP comparators 13, 23 are illustrated as being of active low logic in FIG. 3, they may be of active high logic.

An SCP waveform shown in FIG. 3C goes to an error low level L after elapse of a time measured by the timer which corresponds to the momentary interruption region 41 from the point A to the point B shown in FIG. 3A. As indicated by the dotted line on a PWM waveform in the event of an SCP error as shown in FIG. 3E, the PWM signal from the PWM control circuit 5 is forcibly stopped from the point B.

When as shown in a bottom-peak output voltage change of FIG. 3F, a slow-fall output voltage change of 3G, or a sharp-fall output voltage change of 3H, a full short-circuit region 42 which is a short circuit and a full drop to the ground level GND, i.e., a sharp change of the output voltage Vo, appears, it is assumed that the output voltage Vo drops to a level below a predetermined reference voltage VrefG (e.g., 0.1 V).

Then, the SCP-GND comparator 31 shown in FIG. 2 detects the full voltage drop, and outputs a low-level signal from a point C. In addition, it is assumed that the SCP-GND comparator 31 normally produces an output signal at a high level H. Though the output signal from the SCP-GND comparator 31 is illustrated as being of active low logic in FIG. 3, they may be of active high logic.

At this time, the SCP waveform shown in FIG. 3C goes to the error low level L immediately from the full short-circuit region 42 at the point C as shown in FIG. 3F, or actually after elapse of a time measured by the timer which corresponds to the full short-circuit region 42 at the point C. As indicated by the solid line on the PWM waveform in the event of an SCP error as shown in FIG. 3E, the PWM signal from the PWM control circuit 5 is forcibly stopped from the point C.

In the above embodiment, the power supply device has the single SCP-GND comparator 31 for detecting a full short circuit when the output voltage Vo suffers a sharp change, i.e., suffers a short circuit and fully drops to the ground level GND in the full short-circuit region 42. However, the power supply device may have a plurality of SCP-GND comparators 31 for forcibly stopping the PWM signals from the PWM control circuit at different times corresponding to the different times of voltage changes in the different modes shown in FIG. 3F, 3G, or 3H, for thereby controlling the period of time until the output voltages are cut off. According to this modification, it is possible to eliminate any faults of the DC/DC converter IC and the external circuit in the event of a failure.

The power supply device according to the present invention is applicable to the supply of a power supply voltage from a dry battery to an imaging device or an optical system actuator in a portable electronic device such as a digital camera or a video recorder with a built-in camera.

Although a certain preferred embodiment of the present invention has been shown and described in detail, it should be understood that various changes and modifications may be made therein without departing from the scope of the appended claims.

What is claimed is:

1. A power supply device for use as a DC/DC converter including a voltage converting unit for converting a primary input DC voltage into a secondary output DC voltage, comprising:
   a pulse width control unit for controlling voltage converting operation of the voltage converting unit by changing a pulse width;
   a momentary interruption detecting unit for detecting a change in the secondary output DC voltage when the secondary output DC voltage suffers a momentary interruption over a short period of time;
   a full short-circuit detecting unit for detecting a change in the secondary output DC voltage when the secondary output DC voltage suffers a short circuit over a very short period of time by comparing the secondary output DC voltage with a reference voltage being close to ground; and
   a short-circuit control unit for stopping the pulse width control unit from controlling the voltage converting operation of the voltage converting unit a predetermined period of time after the momentary interruption detecting unit has detected that the secondary DC output voltage suffers a momentary interruption, and for stopping the pulse width control unit from controlling the voltage converting operation of the voltage converting unit immediately when the full short-circuit detecting unit detects that the secondary DC output voltage suffers a short circuit.

2. A power supply device according to claim 1, wherein a full short-circuit region in which said full short-circuit detecting unit detects the change in the secondary output DC voltage is shorter in time than a momentary interruption region in which said momentary interruption detecting unit detects the change in the secondary output DC voltage.

3. A power supply device according to claim 1, wherein a full short-circuit region in which said full short-circuit detecting unit detects the change in the secondary output DC voltage is lower in voltage than a momentary interruption region in which said momentary interruption detecting unit detects the change in the secondary output DC voltage.

4. A power supply device according to claim 1, wherein the change in the secondary output DC voltage which is detected by said full short-circuit detecting unit is a bottom-peak output voltage change.

5. A power supply device according to claim 1, wherein the change in the secondary output DC voltage which is detected by said full short-circuit detecting unit is a slow-fall output voltage change.

6. A power supply device according to claim 1, wherein the change in the secondary output DC voltage which is detected by said full short-circuit detecting unit is a sharp-fall output voltage change.

7. A power supply device according to claim 1, wherein the short-circuit control unit stops the pulse width control unit from controlling the voltage converting operation of the voltage converting unit by preventing a pulse width modulation signal from propagating between the pulse width control unit and the voltage converting unit.

8. A power supply device according to claim 1, wherein the full short-circuit detecting compares the secondary output DC voltage with a reference voltage being close to ground using a digital comparator.

9. A power supply device for use as a DC/DC converter including a plurality of voltage converting units for converting a primary input DC voltage into a plurality of secondary output DC voltages, each voltage converting unit comprising:
- a pulse width control unit for controlling voltage converting operation of the voltage converting unit by changing a pulse width;
- a momentary interruption detecting unit for detecting a change in a secondary output DC voltage when the secondary output DC voltage suffers a momentary interruption over a short period of time; and
- a full short-circuit detecting unit for detecting a change in the secondary output DC voltage when the secondary output DC voltage suffers a short circuit over a very short period of time;

wherein the power supply device further comprises a short-circuit control unit for stopping the plurality of pulse width control units from controlling the respective voltage converting operations of the voltage converting units a predetermined period of time after any one of the momentary interruption detecting units has detected that the respective secondary DC output voltage suffers a momentary interruption, and for stopping the plurality of pulse width control units from controlling the respective voltage converting operations of the voltage converting units immediately when any one of the full short-circuit detecting units detects that the respective secondary DC output voltage suffers a short circuit.

* * * * *